United States Patent
Jin et al.

(10) Patent No.: US 9,940,577 B2
(45) Date of Patent: Apr. 10, 2018

(54) FINDING SEMANTIC PARTS IN IMAGES

(71) Applicant: ADOBE SYSTEMS INCORPORATED, San Jose, CA (US)

(72) Inventors: Hailin Jin, San Jose, CA (US); Jonathan Krause, Stanford, CA (US); Jianchao Yang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 333 days.

(21) Appl. No.: 14/793,157

(22) Filed: Jul. 7, 2015

(65) Prior Publication Data
US 2017/0011291 A1  Jan. 12, 2017

(51) Int. Cl.
G06K 9/62 (2006.01)
G06N 3/08 (2006.01)
G06N 99/00 (2010.01)
G06F 17/30 (2006.01)
G06K 9/00 (2006.01)
G06K 9/46 (2006.01)

(52) U.S. Cl.
CPC ....... *G06N 3/088* (2013.01); *G06F 17/30247* (2013.01); *G06K 9/00362* (2013.01); *G06K 9/4628* (2013.01); *G06K 9/627* (2013.01); *G06K 9/6218* (2013.01); *G06N 99/005* (2013.01)

(58) Field of Classification Search
CPC .... G06K 9/627; G06K 9/6218; G06K 9/4628; G06K 9/00362; G06N 99/005; G06N 3/088; G06F 17/30247
See application file for complete search history.

(56) References Cited

U.S. PATENT DOCUMENTS 6,035,055 A * 3/2000 Wang ................ G06F 17/30256
382/118
6,473,535 B1 * 10/2002 Takaoka ............... H04N 1/6011
358/443

(Continued)

OTHER PUBLICATIONS

Gal et al. "Deep Bayesian Active Learning with Image Data" Workshop on Bayesian Deep Learning, NIPS 2016, Barcelona, pp. 1-9.*

(Continued)

*Primary Examiner* — Iman K Kholdebarin
(74) *Attorney, Agent, or Firm* — Shook, Hardy & Bacon, L.L.P.

(57) ABSTRACT

Embodiments of the present invention relate to finding semantic parts in images. In implementation, a convolutional neural network (CNN) is applied to a set of images to extract features for each image. Each feature is defined by a feature vector that enables a subset of the set of images to be clustered in accordance with a similarity between feature vectors. Normalized cuts may be utilized to help preserve pose within each cluster. The images in the cluster are aligned and part proposals are generated by sampling various regions in various sizes across the aligned images. To determine which part proposal corresponds to a semantic part, a classifier is trained for each part proposal and semantic part to determine which part proposal best fits the correlation pattern given by the true semantic part. In this way, semantic parts in images can be identified without any previous part annotations.

20 Claims, 6 Drawing Sheets

(56) References Cited

U.S. PATENT DOCUMENTS

| | | | |
|---|---|---|---|
| 6,727,942 B1* | 4/2004 | Miyano | H04N 9/735 348/223.1 |
| 7,606,708 B2* | 10/2009 | Hwang | G10L 15/06 704/257 |
| 9,400,955 B2* | 7/2016 | Garimella | G06N 3/082 |
| 9,443,141 B2* | 9/2016 | Mirowski | A61B 5/0476 |
| 9,767,386 B2* | 9/2017 | Lin | G06K 9/6256 |
| 2001/0023419 A1* | 9/2001 | Lapointe | G06F 19/345 706/15 |
| 2002/0196973 A1* | 12/2002 | Schroder | H04N 1/6072 382/167 |
| 2004/0070678 A1* | 4/2004 | Toyama | G06F 17/30265 348/231.3 |
| 2005/0105776 A1* | 5/2005 | Luo | G06K 9/00664 382/115 |
| 2006/0110036 A1* | 5/2006 | Luo | G06F 17/30259 382/170 |
| 2009/0157638 A1* | 6/2009 | Flynn | G06F 17/30265 |
| 2009/0208116 A1* | 8/2009 | Gokturk | G06F 17/30259 382/209 |
| 2011/0182469 A1* | 7/2011 | Ji | G06K 9/00335 382/103 |
| 2011/0293165 A1* | 12/2011 | Malon | G06K 9/00 382/133 |
| 2013/0121548 A1* | 5/2013 | Kovalan | G06T 7/143 382/128 |
| 2015/0170020 A1* | 6/2015 | Garimella | G06N 3/082 706/14 |
| 2015/0213599 A1* | 7/2015 | Buzaglo | G06T 7/0012 382/128 |
| 2016/0034788 A1* | 2/2016 | Lin | G06K 9/627 382/157 |
| 2016/0035078 A1* | 2/2016 | Lin | G06T 7/0002 382/157 |
| 2016/0093048 A1* | 3/2016 | Cheng | G06T 7/30 382/131 |
| 2016/0093050 A1* | 3/2016 | Kim | G06K 9/36 382/128 |
| 2016/0140146 A1* | 5/2016 | Wexler | G06F 17/30253 707/741 |
| 2016/0224892 A1* | 8/2016 | Sawada | G06N 3/08 |
| 2016/0364625 A1* | 12/2016 | Lin | G06T 7/60 |
| 2016/0379091 A1* | 12/2016 | Lin | G06K 9/00724 382/156 |
| 2017/0212875 A1* | 7/2017 | Foresti | G06F 3/0482 |
| 2017/0262479 A1* | 9/2017 | Chester | G06F 17/30277 |
| 2017/0294000 A1* | 10/2017 | Shen | G06T 5/005 |
| 2017/0364773 A1* | 12/2017 | Lin | G06K 9/6256 |

OTHER PUBLICATIONS

Pinheiro et al. "Recurrent Convolutional Neural Networks for Scene Labeling" Proceedings of the 31st International Conference of Machine Learning, Beijin, China 2014, vol. 32 pp. 1-9.*

* cited by examiner

FINDING SEMANTIC PARTS IN IMAGES

BACKGROUND

Computer vision strives to duplicate the abilities of human vision by electronically perceiving and understanding an image. Fine-grained recognition refers to the task of distinguishing subordinate categories, such as bird species, dog breeds, aircraft, or car models. Annotation has proven useful in fine-grained recognition and other fields. In this regard, part annotation (e.g., for a keypoint or bounding box around a semantic part) has proven particularly useful. For example, given an image of a particular object (e.g., a bird), a user may want to identify where various parts are for the object (e.g., the bird's head, beak, wing, feet, and eyes).

Although, annotations for various visual attributes (e.g., color) may be available, annotations for the location of these parts is lacking. In a manual approach, a user is required to hand-annotate where each of these parts are located in the image. Unfortunately, for a large collection of images, this hand-annotation process is extremely time-consuming and cost-prohibitive.

The most common automated approach is to generate a large set of proposed parts and train classifiers to predict local attributes at each proposed part. In this way, the proposed part that best predicts the attributes at a particular semantic location is determined to be that semantic location (e.g., if one part proposal is the best predictor of wing color, then that part proposal is classified as a bird wing). Unfortunately, this approach ignores the large correlation between attributes at different semantic parts and the part proposal is often incorrectly classified.

SUMMARY

Embodiments of the present invention relate to finding semantic parts in images. Initially, a convolutional neural network (CNN) is applied to a set of images to extract features for each image. Each image can be defined by a feature vector that enables a subset of the set of images to be clustered in accordance with a similarity between feature vectors. The images in the cluster are aligned and part proposals are generated by sampling various regions in various sizes across the aligned images. Each region corresponds to exactly one other region per image in the cluster. To determine which part proposal corresponds to a semantic part, a classifier is trained for each part proposal and semantic part to determine which part proposal best fits the correlation pattern given by the true semantic part. In this way, semantic parts in images can be identified without any previous part annotations.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
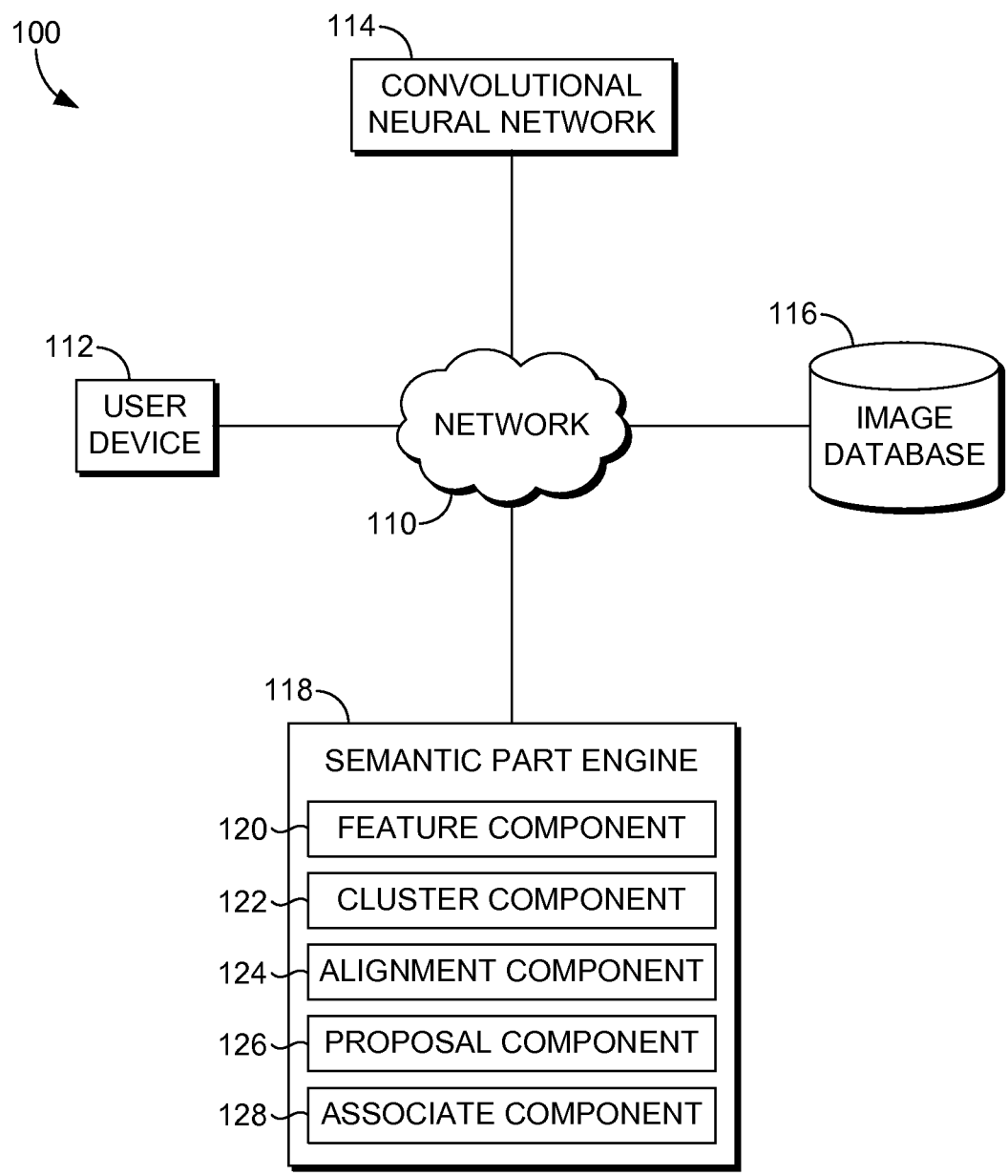
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed previously, part annotation has proven particularly useful in the field of fine-grained recognition. Annotations for various visual attributes are often available for a collection of images. However, annotations for the location of these parts do not currently exist. In some limited instances, users hand-annotate where each of these parts are located within the image. However, in a large collection of images, this manual process is extremely time-consuming and cost-prohibitive.

Utilizing an automated approach to generate a large set of proposed parts can also be problematic. After these systems train classifiers to predict local attributes at each proposed part, the proposed part that best predicts the attributes at a particular semantic location can be determined to be that semantic location. For example, if a part proposal is the best predictor of wing color, then that part proposal may be classified as a bird wing. Unfortunately, this approach ignores the large correlation between attributes at different semantic parts. For example, the part proposal may also be a predictor of other parts of the bird (i.e., there is a correlation between the color of the wing and the color of different parts of the bird). This correlation problem often results in the wrong part being classified as a particular part (i.e., a wing in this example).

In another example, a part proposal (e.g., the headlight of a car) may be mislabeled because multiple parts for the subject of the image may distinguish the subject of the image (e.g., a certain make of a car). Although, in this example, the part proposal is the headlight of the car, the grill of the car may similarly distinguish the make of the car. Unfortunately, current automated systems are likely to classify the part proposal incorrectly as the grill of the car because the current systems ignore the correlations between semantic parts.

Embodiments of the present invention generally relate to finding semantic parts in images. Initially, a convolutional neural network (CNN) is applied to a set of images to detect features for each image. Each image can be defined by a feature vector that enables a subset of the set of images to be clustered in accordance with a similarity between feature vectors. Normalized cuts can be utilized to help preserve pose within each cluster which allows the images in the cluster to be aligned. Once aligned, part proposals can be generated by sampling various regions in various sizes across the aligned images. Each region corresponds to exactly one other region per image in the cluster. As discussed in more detail below, a classifier is trained for each part proposal and semantic part to determine which part proposal best fits the correlation pattern given by the true semantic part. In this way, semantic parts in images can be identified without any previous part annotations.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as environment 100.

The environment 100 of FIG. 1 includes a user device 112, a CNN 114, an image database 116, and a semantic part engine 118. Each of the user device 102, CNN 114, image database 116, and semantic part engine 118 may be, or include, any type of computing device (or portion thereof) such as computing device 600 described with reference to FIG. 6, for example. The components may communicate with each other via a network 110, which may include, without limitation, one or more local area networks (LANs) and/or wide area networks (WANs). Such networking environments are commonplace in offices, enterprise-wide computer networks, intranets, and the Internet. It should be understood that any number of user devices, advertiser optimizer, and advertisement delivery systems may be employed within the environment 100 within the scope of the present invention. Each may comprise a single device or multiple devices cooperating in a distributed environment. For instance, the CNN 114 and/or semantic part engine 118 may be provided via multiple devices arranged in a distributed environment that collectively provide the functionality described herein. Additionally, other components not shown may also be included within the environment 100, while components shown in FIG. 1 may be omitted in some embodiments.

The user device 112 may be any type of computing device owned and/or operated by a user that can access network 110. For instance, the user device 112 may be a desktop computer, a laptop computer, a tablet computer, a mobile device, or any other device having network access. Generally, a user may employ the user device 112 to, among other things, access images maintained by image database 116. For example, the user may employ a web browser on the user device 112 to access and view images from image database 116. The image database 116 may be any type of server device capable of hosting one or more images and serving the one or more images to computing devices, such as the user device 112. By way of example, and not limitation, the image database 116 may be a server maintaining one or more images used to train the CNN 114 that, in turn, provides various functionality to the semantic part engine 118.

The semantic part engine 118 is generally configured to facilitate finding semantic parts in images. Typically, semantic part engine 118 communicates with the CNN 114 and the image database 116 to identify various parts within an image. In accordance with embodiments described herein, the semantic part engine 118 can include a feature component 120, a cluster component 122, an alignment component 124, a proposal component 126, and an associate component 128. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules may be implemented as stand-alone applications. In other embodiments, one or more of the illustrated components/modules may be integrated directly into the operating system of the semantic part engine 118. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the semantic part engine 118 might reside on a server, cluster of servers, or a computing device remote from or integrated with one or more of the remaining components.

The semantic part engine 118 may be any type of computing device, or incorporated into a computing device, that can access a network (e.g., network 110). For instance, the semantic engine 118 may be a desktop computer, a laptop computer, a tablet computer, a mobile device, a server, or any other device, or portion thereof, having network access. Generally, a user may employ the semantic part engine 118 via the user device 112 to, among other things, determine images with similar poses, sample part proposals, and/or associate part proposals with semantic parts.

In some embodiments, the user may employ the semantic part engine 118 via the user device 112 to search a collection of images based on semantic parts, edit a particular part in an image, and/or perform parts-based image recognition. For example, a user may have an image that does not have annotations for its semantic parts. The user may initially utilize the semantic part engine 118 to identify semantic parts for the image. If the user wishes to edit the image and replace a particular part in the image, the user may select the particular part. The user may again utilize the semantic part engine 118 to identify potential replacement parts and edit the image with a replacement part.

To illustrate the above example, a user may have an image containing a particular object (e.g., a dog). The image may not have any semantic parts labeled. However, utilizing the semantic part engine 118, the semantic parts associated with the object may be labeled (e.g., tail, snout, ears, legs, etc.). The user may wish to edit the image to replace one of the semantic parts with a semantic part from another image (e.g., the snout of a different breed of dog). The user may utilize the semantic part engine 118 to search for images with a different semantic part from a collection of images until the user finds a satisfactory replacement part. The user may then edit the image with the replacement part.

As previously mentioned, in embodiments, the semantic part engine 118 includes a feature component 120, a cluster component 122, an alignment component 124, a proposal component 126, and an associate component 128 to facilitate finding semantic parts in images. In particular, semantic part engine 118 communicates with the CNN 114 and the image database 116 to identify various parts within an image. Generally, to find semantic parts in images, several preliminary steps are performed on a collection of images. First, images that contain objects with similar poses are determined and clustered. Next, each image in a particular cluster is aligned so that part proposals can be generated. Once the part proposals are generated, the part proposals can be associated with semantic parts, taking into account the correlation between semantic parts.

The feature component 120 is generally configured to detect features for images. In some embodiments, it is assumed that for each image there is a user-provided bounding box that segments the image to identify the object of interest. In some embodiments, the image may be segmented automatically utilizing any type of segmentation algorithm. The features for each of the images may be computed by an unsupervised CNN. As can be appreciated, the architecture of the CNN may have a variety of layers. For example, the CNN may contain five convolutional and three fully-connected layers.

In embodiments, the output of the last fully-connected layer may be fed to an N-way softmax which produces a distribution over N class labels. Rectified linear units (ReLUs) non-linearity may be applied to the output of each layer. In some embodiments, response-normalization layers follow the first two convolutional layers. Max-pooling layers may follow both response-normalization layers as well as the fifth convolutional layer.

In some embodiments, the first convolutional layer filters a 224×224×3 input image with 96 kernels of size 11×11×3 with a stride of 4 pixels. The second convolutional layer may take the output of the first convolutional layer as input and filter it with 256 kernels of size 5×5×48. The third, fourth, and fifth convolutional layers may be connected to each other without any pooling or normalization layers. In this regard, the third convolutional layer may have 384 kernels of size 3×3×256 connected to the normalized and pooled outputs of the second convolutional layer. The fourth convolutional may have 384 kernels of size 3×3×192 and the fifth convolutional layer may have 256 kernels of size 3×3×192. The fully-connected layers may have 4096 neurons each. In some embodiments, features are computed in each bounding box from the fourth layer of a convolutional neural network. The Euclidean distance between these feature vectors may be used as a distance metric after $L_2$-normalization.

The cluster component 122 is generally configured to cluster a subset of the images in accordance with a similarity between feature vectors. The goal of clustering is to create a subset of images that comprise a similar object of interest. Clustering may be accomplished via normalized cuts, which may facilitate preserving pose within each cluster. To do so, a graph G=(V, E) may be formed utilizing the features vectors of the images. The nodes of the graph represent the features and edges are formed between nodes. The weight of each edge is a function of the similarity between nodes.

Clustering the available nodes is often referred to as a cut and can be defined by cut(A, B)=$\Sigma_{u \in A, v \in B}$w(u, v). Thus, the graph may be partitioned into two sets, A and B, where A∪B=V and A∩B≠0. In traditional graph theory, the optimal partitioning of the graph is the one that minimizes the cut value. However, this often results in only cutting a small set of isolated nodes. Instead the cluster component 122 may utilize a normalized cut, which can be defined by $$(A, B) = \frac{cut(A, B)}{assoc(A, V)} + \frac{cut(A, B)}{assoc(B, V)},$$

where assoc (A, V)=$\Sigma_{u \in A, t \in V}$w(u, t) and assoc (B, V)= $\Sigma_{u \in B, t \in V}$ w(u, t). The normalized cut minimizes the disassociation between the groups and maximizes the association between nodes within each group, which results in clusters of images comprising similar objects of interest.

In some embodiments, normalized cuts may yield multiple clusters. Given a set of features, a weighted graph G=(V, E) may be set up with weights computed on each edge summarized into W and D. An eigenvalue problem, (D−W) x=λ Dx can be solved for the k-largest eigenvectors which may then be clustered with k-means to get the cluster assignments.

The alignment component 124 is generally configured to align the subset of images in the cluster. Any type of alignment process may be utilized to align the subset of images. In some embodiments, the alignment process utilizes the bounding box or segmentations provided in each image.

It may be assumed that an object comprises a set of points and its shape can be defined by a finite subset of its points. In this way, a shape may be represented by a discrete set of points sampled from various contours (i.e., internal or external) on the object. In some embodiments, edge pixels may be identified, such as by an edge detector, yielding a set P of n points, where P={$p_1, \ldots, p_n$}, $p_i \in IR^2$.

To find a matching point $q_j$ on a second shape for each point $p_i$ in a first shape, a set of vectors originating from a point on the first shape to selected sample points on the shape can be considered. In this way, a course histogram $h_i$ can be computed for a point $p_i$ on the shape for the remaining points, where $h_i(k)=\#\{q \neq p_i:(q-p_i) \in bin(k)\}$. This histogram represents the shape context for $p_i$.

Next, a cost for matching points $p_i$ on the first shape and $q_j$ on a second shape is defined by $C_{ij}=C(p_i, q_j)$. Since shape contexts are distributions represented as histograms, the $\chi^2$ similarity test may be utilized. Thus, $$C_{ij} \equiv C(p_i, q_j) = \frac{1}{2}\sum_{k=1}^{K} \frac{[hi(k) - hj(k)]2}{hi(k) + hj(k)},$$

where $h_i(k)$ and $h_j(k)$ represent the K-bin normalized histogram at points $p_i$ and $q_j$, respectively. In some embodiments, a cost $C_{ij}$ for matching points based on a local appearance similarity at points $p_i$ and $q_j$ can be included.

Once the cost $C_{ij}$ between all pairs of points $p_i$ on the first shape and $q_j$ on the second shape have been determined, the total cost can be minimized by H(π)=$\Sigma_i$ C($p_i$, $q_{\pi(i)}$), where the matching is one-to-one (i.e., π is a permutation). In the case of outlier points between the first and second shapes, a point may be matched to a "dummy" point where no real match is available. As the cost becomes minimized, the shapes become aligned. This process may be repeated to learn alignments for each image in the subset of images.

The proposal component 126 is generally configured to generate a plurality of part proposals. As can be appreciated the part proposals are generated for each subset of aligned images. A set of points may be sampled in a single image in the subset of aligned images. The single image may be the image that is closest to the cluster centroid (such as may be determined by the feature vectors associated with the subset of images). The set of points is then propagated to every other image in the subset of images based on the learned alignments.

In some embodiments, a set of part proposals are generated by sampling regions around these points in various sizes since the scale of each semantic part may not be known. The set of part proposals yields a set of regions in each image, where each region corresponds to exactly one other region in each image in the subset of images. In this way, each set of part proposals corresponds to the set of part proposals for every other image in the subset of images.

The associate component 128 is generally configured to associate a label with each of the part proposals. Utilizing the part proposals provided by the proposal component 126, the associate component 128 may train a classifier to identify different attributes for the category associated with the subset of images. For example, if the category is birds, a classifier may be trained to identify different attributes of the birds, such as color of wing, color of head, shape of beak, and the like.

In some embodiments, the information gain between semantic parts i and j may be represented by $I_{ij}$ and can be computed using the attribute labels for each image. The associate component 128 may assume that one of the part proposals p is actually semantic part i. Using this assumption, a classifier can be trained at part proposal p for the attributes localized at semantic part i. The information gain between this classifier and the ground truth attributes of each other semantic part j can be calculated. The choice of which part proposal corresponds to semantic part i can then be determined by $\arg\min_p \|(I_{i,j})_{j=1}^n - (I_{i,j}^p)_{j=1}^n\|$, where $(I_{i,j})_{j=1}^n$ is a vector of information gains between semantic part i and each other semantic part j. In this way, the correlation between semantic parts is taken into consideration and the accuracy of identifying the correct semantic part is greatly improved.

For example, assume the subset of images can be categorized as cars. Further assume that the subset is constrained to images of the front portion of cars such that the images can be aligned as described herein. Thus, a set of points in one image of the car can be mapped to a set of points in every other image in the subset. Still further, assume that each point in the set of points maps to one and only one point in the set of points for every image in the subset.

Once the images have been clustered and aligned in this way, various part proposals may be generated for a single image in the subset, as described herein. In some embodiments, the single image is the image closest to the cluster centroid for the subset of images. A classifier can be trained at a part proposal for the single image for the attributes localized at an unclassified or unlabeled semantic part. The information gain between the classifier and the ground truth attributes for every other semantic part can then be calculated. This can be repeated for other part proposals until the information gain at other semantic parts of the image matches an expected pattern. Once the information gain matching process identifies the expected pattern, the part proposal can be labeled as that semantic part.

Figure 2:
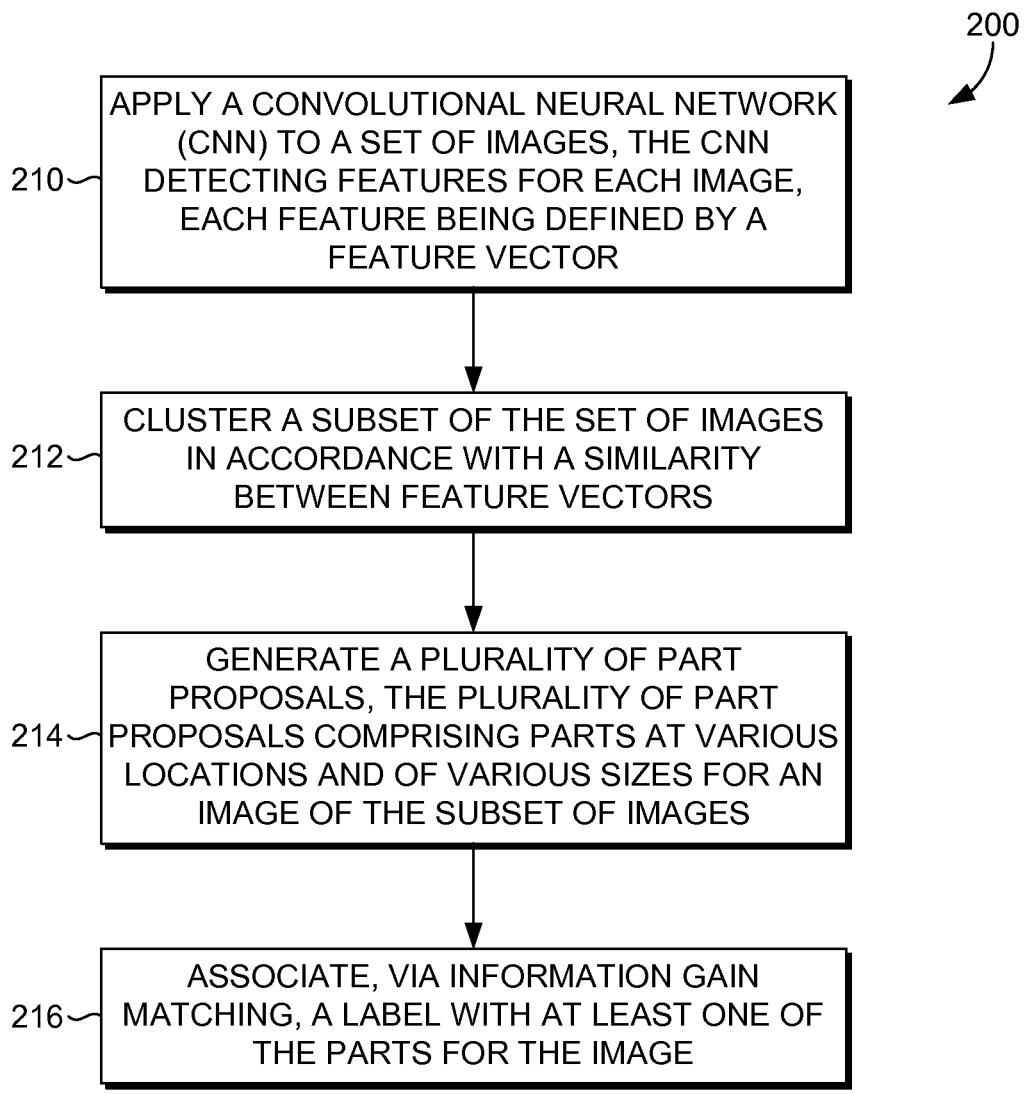
FIG. 2 is a flow diagram showing a method for associating semantic labels with parts of images, in accordance with an embodiment of the present invention.

Referring now to FIG. 2, a flow diagram is provided that illustrates a method 200 for associating semantic labels with parts of images, in accordance with an embodiment of the present invention. Such a method can be performed, for example, at a semantic part engine, such as semantic part engine 118 of FIG. 1. As shown at step 210, a CNN is applied to a set of images to detect features for each image. In this way, features may be extracted from a particular layer of the CNN. In some embodiments, the features are extracted from the fourth layer of the CNN. The features are defined by feature vectors which may be utilized to construct a feature graph. In some embodiments, Euclidean distance is utilized as a distance metric between feature vectors after $L_2$ normalization.

A subset of the set of images may be clustered, at step 212, in accordance with a similarity between feature vectors. This creates a subset of images that comprise a similar object of interest. In some embodiments, normalized cuts (as described herein) are utilized to cluster the subset of images provided in the feature graph. The normalized cuts may additionally facilitate preserving pose within each cluster. As mentioned above, normalized cuts minimize the disassociation between the groups and maximize the association between nodes within each group, resulting in clusters or subsets of images comprising similar objects of interest. In some embodiments, each image in the subset of images is aligned, as described herein.

Figure 3:
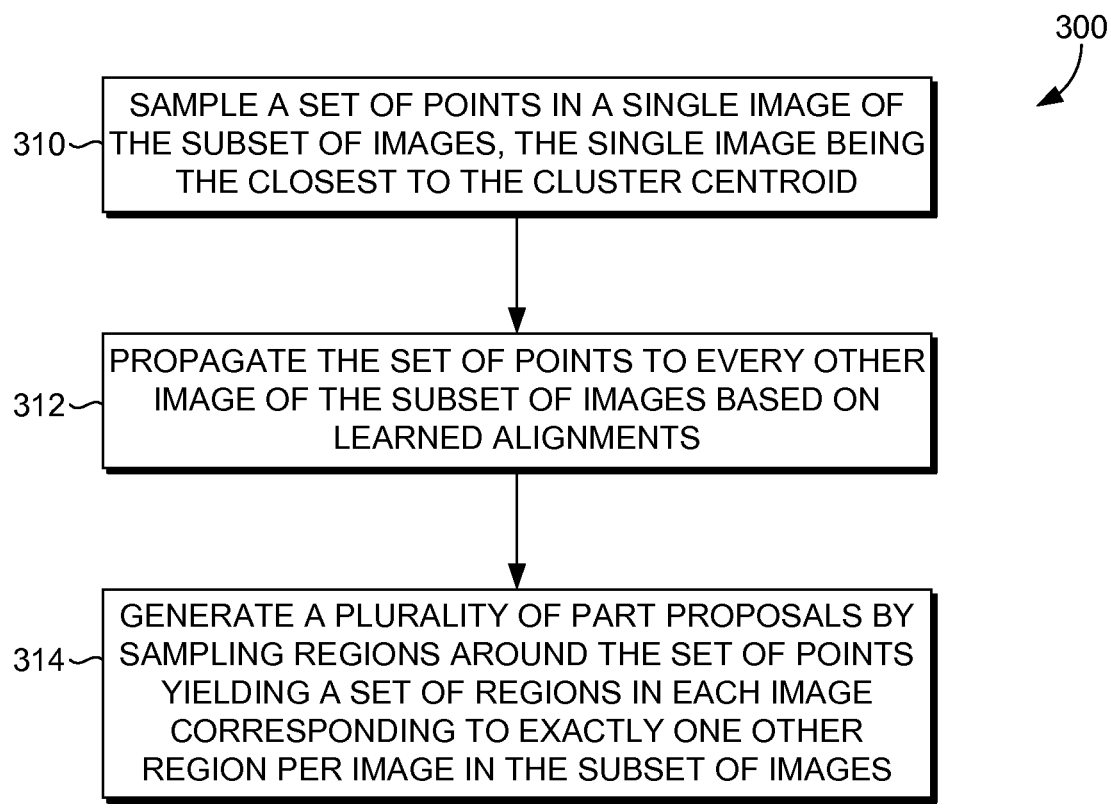
FIG. 3 is a flow diagram showing a method for generating part proposals for a subset of images, in accordance with an embodiment of the present invention.

At step 214, a plurality of part proposals is generated. Referring now to FIG. 3, a flow diagram is provided that illustrates a method 300 for generating part proposals for a subset of images, in accordance with an embodiment of the present invention. Such a method can be performed, for example, at a semantic part engine, such as semantic part engine 118 of FIG. 1. As shown at step 310, a set of points in a single image of the subset of images is sampled. The single image is the image that is closest to the cluster centroid in the feature graph. The set of points is propagated, at step 312, to every other image of the subset of images based on learned alignments. Once the images are aligned, a plurality of part proposals is generated, at step 314, by sampling regions around the set of points yielding a set of regions in each image. The set of regions in each image corresponds to exactly one other region per image in the subset of images. The plurality of part proposals comprises parts at various locations and of various sizes for an image of the subset of images. In some embodiments, each image is annotated with one or more localized attribute labels. A classifier can be trained at a part proposal for the image for the attributes localized at an unclassified or unlabeled semantic part.

Referring back to FIG. 2, at step 216, a label with at least one of the parts for the image is associated via information gain matching (as described in more detail below with respect to FIG. 4). To do so, the information gain between the classifier and the ground truth attributes for every other semantic part can then be calculated. This is repeated for other part proposals until the information gain at other semantic parts of the image matches an expected pattern. Once the information gain matching process identifies the expected pattern, the part proposal can be labeled as that semantic part.

Figure 4:
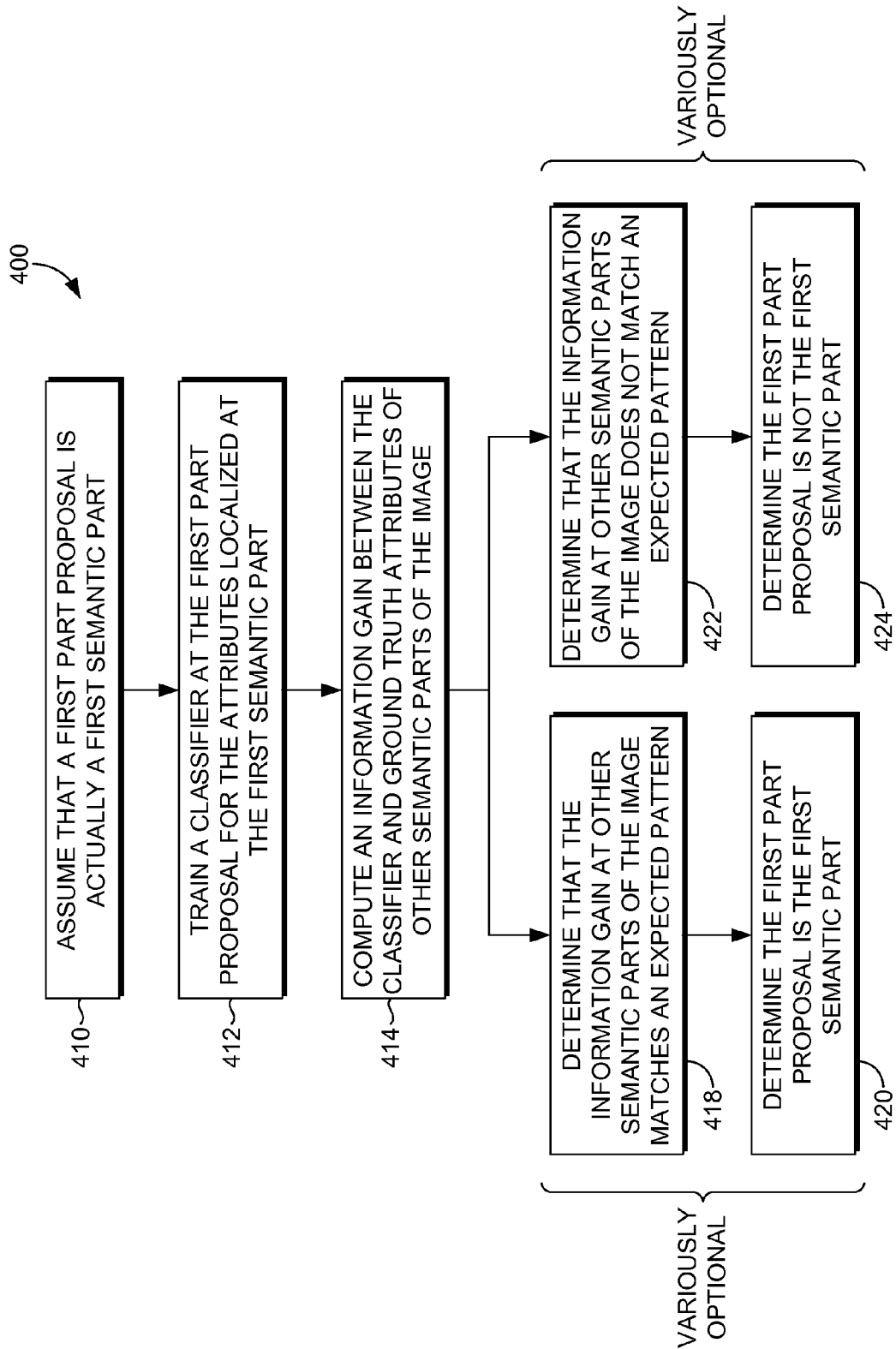
FIG. 4 is a flow diagram showing a method for associating part proposals with semantic parts, in accordance with an embodiment of the present invention.

Turning now to FIG. 4, a flow diagram is provided that illustrates a method 400 for associating part proposals with semantic parts, in accordance with an embodiment of the present invention. Such a method can be performed, for example, at a semantic part engine, such as semantic part engine 118 of FIG. 1. As can be appreciated, additional or alternative steps may also be included in different embodiments. Initially, as indicated at step 410, a first part proposal is assumed to actually be a first semantic part. A classifier is trained, at step 412, at the first part proposal for the attributes localized at the first semantic part. An information gain is computed, at step 414, between the classifier and ground truth attributes of other semantic parts of the image.

In some embodiments, as shown at step 418, the information gain at other semantic parts of the image is determined to match an expected pattern. In this regard, the information gain between the classifier for the first semantic part matches what is expected based on known attributes (e.g., the color of a variety of other parts of the image, etc.) for other semantic parts of the image. Thus, it can be determined, at step 420, that the first part proposal is the first semantic part.

Alternatively, as shown at step 422, it may be determined that the information gain at other semantic parts of the image does not match an expected pattern. In this regard, the information gain between the classifier for the first semantic part does not match what is expected based on known attributes for other semantic parts of the image. Thus, it can be determined, at step 424, that the first part proposal is not the first semantic part.

Figure 5:
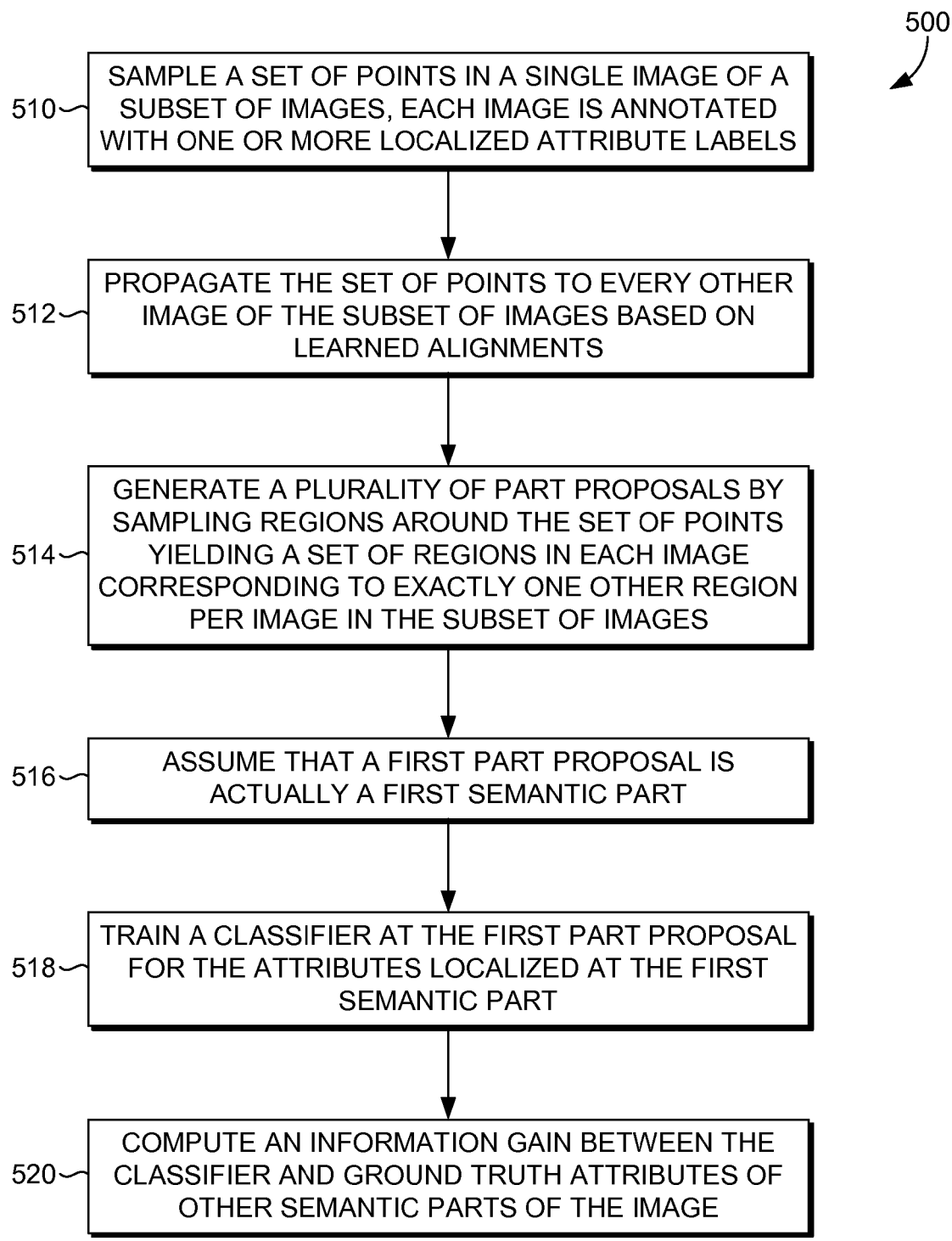
FIG. 5 is a flow diagram showing a method for finding semantic parts in images, in accordance with an embodiment of the present invention.

In FIG. 5, a flow diagram is provided that illustrates a method 500 for finding semantic parts in images, in accordance with an embodiment of the present invention. Such a method can be performed, for example, at a semantic part engine, such as semantic part engine 118 of FIG. 1. As shown at block 510, a set of points in a single image of a subset of images is sampled. In some embodiments, feature vectors associated with each image in a set of images are identified. Each image is annotated with one or more localized attribute labels (e.g., color of a variety of semantic parts for each image). In some embodiments, it is determined that a subset of images in the set of images contains objects of similar poses. This may be determined utilizing normalized cuts, as described herein.

The set of points is propagated, at step 512, to every other image of the subset of images based on learned alignments. The alignments may be learned utilizing shape contexts, as described herein. At step 514, a plurality of part proposals is generated by sampling regions around the set of points. This yields a set of regions in each image corresponding to exactly one other region per image in the subset of images.

A first part proposal is assumed, at step 516, to actually be a first semantic part. At step 518, a classifier is trained at the first part proposal for the attributes localized at the first semantic part. An information gain between the classifier and ground truth attributes of other semantic parts of the image is computed at step 520. In some embodiments, it is determined the information gain at other semantic parts of the image matches an expected pattern. In this way, it can be determined that the first part proposal is the first semantic part. In other embodiments, it is determined the information gain at other semantic parts of the image does not match an expected pattern. In these embodiments, it is determined the first part proposal is not the first semantic part. In this instance, a different part proposal can be assumed to be the first semantic part and the process can be repeated until the first semantic part is identified via information gain matching.

Having described an overview of embodiments of the present invention, an exemplary computing environment in which some embodiments of the present invention may be implemented is described below in order to provide a general context for various aspects of the present invention. Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 6:
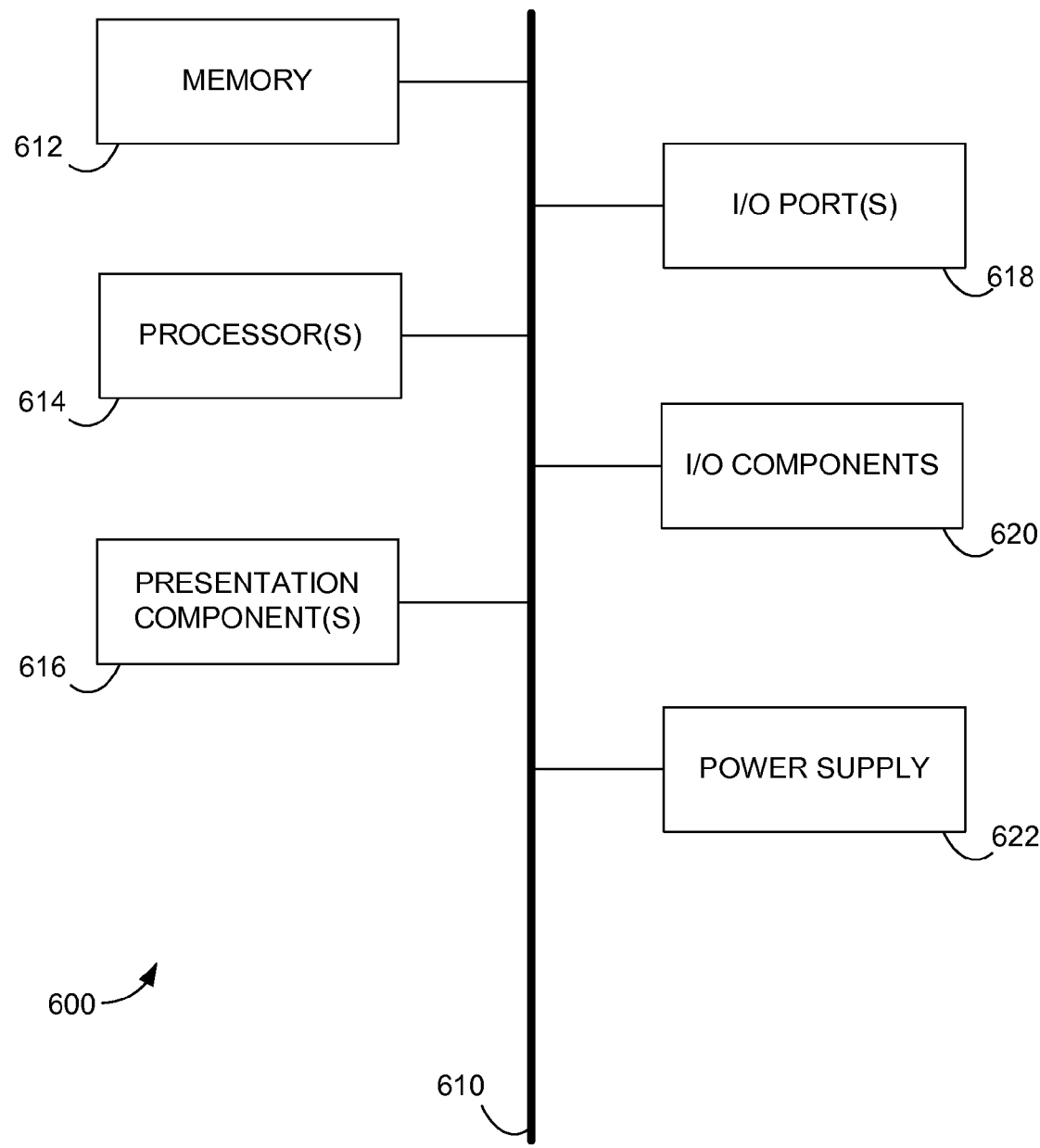
FIG. 6 is a block diagram of an exemplary system in which embodiments of the invention may be employed.

Accordingly, referring generally to FIG. 6, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, facilitating budget allocation based on return on investment. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by a computing device, cause the computing device to perform a method for finding semantic parts in images, the method comprising: applying a convolutional neural network (CNN) to a set of images, the CNN detecting features for each image, each image being defined by a feature vector; clustering a subset of the set of images in accordance with a similarity between feature vectors; generating a plurality of part proposals, the plurality of part proposals comprising parts at various locations and of various sues for an image of the subset of images; and associating, via information gain matching, a label with at least one of the parts for the image.

2. The one or more computer storage media of claim 1, wherein the features are detected by the fourth layer of the CNN.

3. The one or more computer storage media of claim 2, further comprising utilizing Euclidean distance as a distance metric between feature vectors after $L_2$ normalization.

4. The one or more computer storage media of claim 1, wherein the clustering is accomplished via normalized cuts.

5. The one or more computer storage media of claim 1, further comprising aligning each image in the subset of images.

6. The one or more computer storage media of claim 5, further comprising:
    sampling a set of points in a single image of the subset of images, the single image being the closest to the cluster centroid;
    propagating the set of points to every other image of the subset of images based on learned alignments; and
    wherein the plurality of part proposals are generated by sampling regions around the set of points yielding a set of regions in each image corresponding to exactly one other region per image in the subset of images.

7. The one or more computer storage media of claim 1, wherein each image is annotated with one or more localized attribute labels.

8. The one or more computer storage media of claim 1, further comprising:
    assuming that a first part proposal is actually a first semantic part;
    training a classifier at the first part proposal for the attributes localized at the first semantic part; and
    computing an information gain between the classifier and ground truth attributes of other semantic parts of the image.

9. The one or more computer storage media of claim 8, further comprising:
    determining that the information gain at other semantic parts of the image matches an expected pattern; and
    determining the first part proposal is the first semantic part.

10. The one or more computer storage media of claim 8, further comprising:
    determining that the information gain at other semantic parts of the image does not match an expected pattern; and
    determining the first part proposal is not the first semantic part.

11. A method for associating part proposal with semantic parts, the method comprising:
    sampling a set of points in a single image of a subset of images, each image is annotated with one or more localized attribute labels;
    propagating the set of points to every other image of the subset of images based on learned alignments;
    generating a plurality of part proposals by sampling regions around the set of points yielding a set of regions in each image corresponding to exactly one other region per image in the subset of images;

assuming that a first part proposal is actually a first semantic part;

training a classifier at the first part proposal for the attributes localized at the first semantic part; and computing an information gain between the classifier and ground truth attributes of other semantic parts of the image.

12. The method of claim 11, further comprising identifying feature vectors associated with each image in a set of images.

13. The method of claim 12, further comprising determining the subset of images in the set of images that contains objects of similar poses.

14. The method of claim 11, determining the information gain at other semantic parts of the image matches an expected pattern.

15. The method of claim 14, further comprising determining the first part proposal is the first semantic part.

16. The method of claim 11, determining the information gain at other semantic parts of the image does not match an expected pattern.

17. The method of claim 16, further comprising determining the first part proposal is the first semantic part.

18. A computerized system comprising:

one or more processors; and a non-transitory computer storage media storing computer-useable instructions that, when used by the one or more processors, cause the one or more processors to:

apply a convolutional neural network (CNN) to a set of images, the CNN detecting features for each image, each image being defined by a feature vector;

cluster a subset of the set of images in accordance with a similarity between feature vectors;

generate a plurality of part proposals, the plurality of part proposals comprising parts at various locations and of various sizes for an image of the subset of images; and associate a label with at least one of the parts for the image.

19. The computerized system of claim 18, wherein computer-useable instructions that, when used by the one or more processors, cause the one or more processors to:

assume that a first part proposal is actually a first semantic part;

train a classifier at the first part proposal for the attributes localized at the first semantic part; and compute an information gain between the classifier and ground truth attributes of other semantic parts of the image.

20. The computerized system of claim 18, wherein computer-useable instructions that, when used by the one or more processors, cause the one or more processors to:

determine the first part proposal is the first semantic part if the information gain at other semantic parts of the image matches an expected pattern; and determine the first part proposal is not the first semantic part if the information gain at other semantic parts of the image does not match an expected pattern.

* * * * *